United States Patent [19]
Lange, Jr.

[11] Patent Number: 6,142,099
[45] Date of Patent: Nov. 7, 2000

[54] PET FEEDER

[76] Inventor: Andrew J. Lange, Jr., 70185 11th Ave., Abita Springs, La. 70420

[21] Appl. No.: 09/282,940

[22] Filed: Apr. 1, 1999

[51] Int. Cl.[7] ..................................................... A01K 5/00
[52] U.S. Cl. ............................................ 119/51.5; 119/61
[58] Field of Search .......................... 119/51.5, 61, 52.1; D30/129, 130, 131, 133

[56] References Cited

U.S. PATENT DOCUMENTS

| | | | |
|---|---|---|---|
| D. 362,090 | 9/1995 | Baldwin et al. | D30/130 |
| 3,730,141 | 5/1973 | Manning et al. | 119/51.5 |
| 3,782,332 | 1/1974 | Depenthal et al. | 119/51.13 |
| 4,134,365 | 1/1979 | Futers et al. | 119/51.5 |
| 4,735,171 | 4/1988 | Essex | 119/51.12 |
| 4,840,143 | 6/1989 | Simon | 119/52.1 |
| 4,896,627 | 1/1990 | Riddell | 119/51.5 |
| 4,947,796 | 8/1990 | Robinette | 119/51.5 |
| 5,117,778 | 6/1992 | Imamura | 119/51.5 |
| 5,245,948 | 9/1993 | McClellan | 119/51.5 |
| 5,277,149 | 1/1994 | East | 119/51.5 |
| 5,730,082 | 3/1998 | Newman | 119/51.5 |

*Primary Examiner*—Peter M. Poon
*Assistant Examiner*—Yvonne R. Abbott

[57] ABSTRACT

A pet feeder for providing food and water to a pet, in particular feline and canine pets, while protecting the food from ant and other insect infestations. The pet feeder includes an outer tray defining a reservoir for holding a fluid with a food bowl and a base disposed in the reservoir. A jug for holding a fluid therein is coupled to the base. The jug has a lower spout positioned in the reservoir of the outer tray. A food bin designed for holding particulate pet food therein is attached to the jug. The food bin has a bottom spout positioned adjacent and above the food bowl.

4 Claims, 2 Drawing Sheets

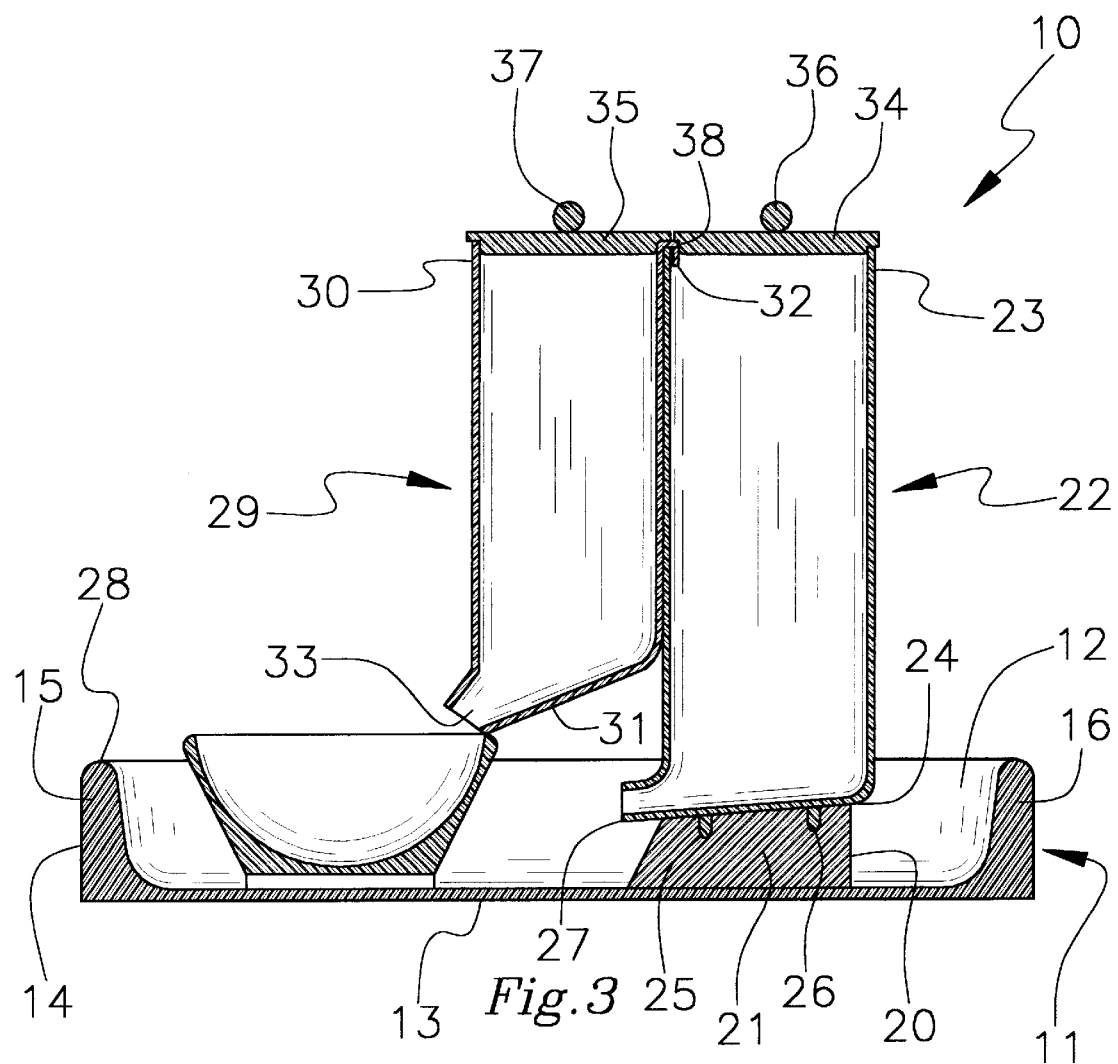
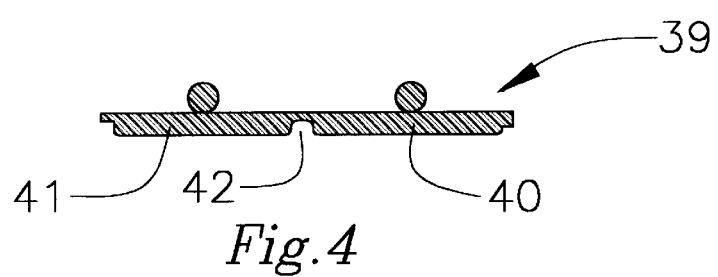

and more
PET FEEDER

BACKGROUND OF THE INVENTION

1. Field of the Invention

The present invention relates to pet feeders and more particularly pertains to a new pet feeder for providing food and water to a pet, in particular feline and canine pets, while protecting the food from ant and other insect infestations.

2. Description of the Prior Art

The use of pet feeders is known in the prior art. More specifically, pet feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,245,948; U.S. Pat. No. 3,720,184; U.S. Pat. No. 5,429,071; U.S. Pat. No. 5,113,798; U.S. Pat. No. 5,117,778; U.S. Pat. No. 4,840,143; and U.S. Pat. No. Des. 371,643.

While these devices fulfill their respective, particular objectives and requirements, the aforementioned patents do not disclose a new pet feeder. The inventive device includes an outer tray defining a reservoir for holding a fluid with a food bowl and a base disposed in the reservoir. A jug for holding a fluid therein is coupled to the base. The jug has a lower spout positioned in the reservoir of the outer tray. A food bin designed for holding particulate pet food therein is attached to the jug. The food bin has a bottom spout positioned adjacent and above the food bowl.

In these respects, the pet feeder according to the present invention substantially departs from the conventional concepts and designs of the prior art, and in so doing provides an apparatus primarily developed for the purpose of providing food and water to a pet, in particular feline and canine pets, while protecting the food from ant and other insect infestations.

SUMMARY OF THE INVENTION

In view of the foregoing disadvantages inherent in the known types of pet feeders now present in the prior art, the present invention provides a new pet feeder construction wherein the same can be utilized for providing food and water to a pet, in particular feline and canine pets, while protecting the food from ant and other insect infestations.

The general purpose of the present invention, which will be described subsequently in greater detail, is to provide a new pet feeder apparatus and method which has many of the advantages of the pet feeders mentioned heretofore and many novel features that result in a new pet feeder which is not anticipated, rendered obvious, suggested, or even implied by any of the prior art pet feeders, either alone or in any combination thereof.

To attain this, the present invention generally comprises an outer tray defining a reservoir for holding a fluid with a food bowl and a base disposed in the reservoir. A jug for holding a fluid therein is coupled to the base. The jug has a lower spout positioned in the reservoir of the outer tray. A food bin designed for holding particulate pet food therein is attached to the jug. The food bin has a bottom spout positioned adjacent and above the food bowl.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet feeder apparatus and method which has many of the advantages of the pet feeders mentioned heretofore and many novel features that result in a new pet feeder which is not anticipated, rendered obvious, suggested, or even implied by any of the prior art pet feeders, either alone or in any combination thereof.

It is another object of the present invention to provide a new pet feeder which may be easily and efficiently manufactured and marketed.

It is a further object of the present invention to provide a new pet feeder which is of a durable and reliable construction.

An even further object of the present invention is to provide a new pet feeder which is susceptible of a low cost of manufacture with regard to both materials and labor, and which accordingly is then susceptible of low prices of sale to the consuming public, thereby making such pet feeder economically available to the buying public.

Still yet another object of the present invention is to provide a new pet feeder which provides in the apparatuses and methods of the prior art some of the advantages thereof, while simultaneously overcoming some of the disadvantages normally associated therewith.

Still another object of the present invention is to provide a new pet feeder for providing food and water to a pet, in particular feline and canine pets, while protecting the food from ant and other insect infestations.

Yet another object of the present invention is to provide a new pet feeder which includes an outer tray defining a reservoir for holding a fluid with a food bowl and a base disposed in the reservoir. A jug for holding a fluid therein is coupled to the base. The jug has a lower spout positioned in the reservoir of the outer tray. A food bin designed for holding particulate pet food therein is attached to the jug. The food bin has a bottom spout positioned adjacent and above the food bowl.

Still yet another object of the present invention is to provide a new pet feeder that uses the pet's water supply as a moat around the pet's food to protect the food from insects crawling therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of the present invention taken from line 3—3 of FIG. 1.

FIG. 4 is a schematic cross sectional view of an single lid embodiment for covering both the upper and top openings of the jug and food bin.

DESCRIPTION OF THE PREFERRED EMBODIMENT

Figures 1, 2:
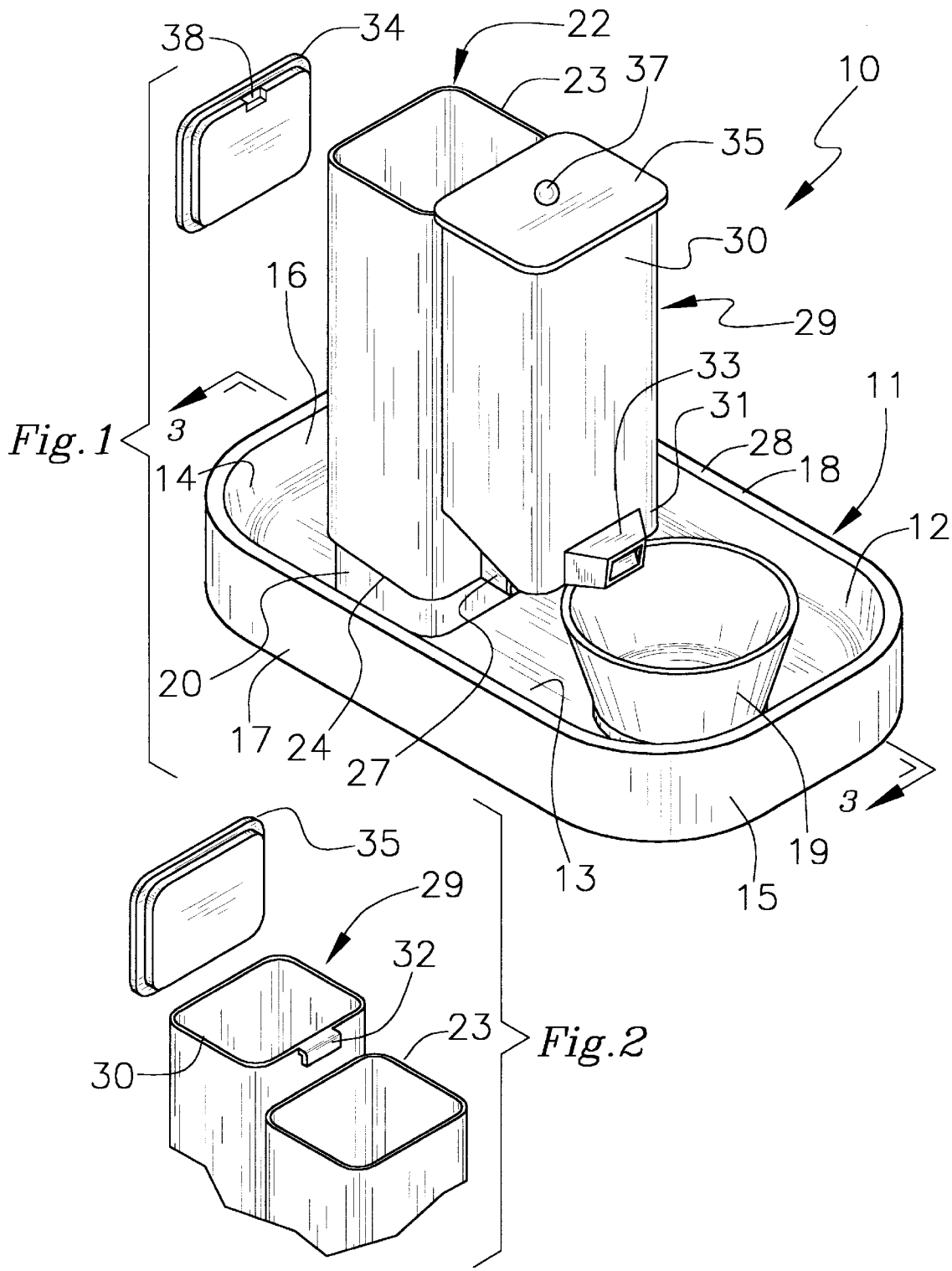
FIG. 1 is a schematic perspective view of a new pet feeder according to the present invention with the lid of the jug removed from the jug.
FIG. 2 is a schematic perspective partial view of the tops of the jug and food bin.

With reference now to the drawings, and in particular to FIGS. 1 through 4 thereof, a new pet feeder embodying the principles and concepts of the present invention and generally designated by the reference numeral 10 will be described.

As best illustrated in FIGS. 1 through 4, the pet feeder 10 generally comprises an outer tray defining a reservoir for holding a fluid with a food bowl and a base disposed in the reservoir. A jug for holding a fluid therein is coupled to the base. The jug has a lower spout positioned in the reservoir of the outer tray. A food bin designed for holding particulate pet food therein is attached to the jug. The food bin has a bottom spout positioned adjacent and above the food bowl.

In use, the pet feeder is designed for preventing ants and other insects (particularly crawling insects) from infesting the pet's food and water supply. In closer detail, the pet feeder 10 comprises an outer tray 11 defining a reservoir 12 for holding a fluid (such as water). The outer tray has a bottom panel 13, and a perimeter wall 14 upwardly extending around the bottom panel of the outer tray.

In one ideal embodiment, the outer tray is generally rectangular in configuration such that the bottom panel has a generally rectangular outer perimeter and the perimeter wall comprises a pair of spaced apart end wall portions 15,16 and a spaced apart pair of side wall 17,18 portions extending between the end wall portions of the perimeter wall. The outer tray has a length defined between the end wall portions, a width defined between the side wall portions, and a height defined between the bottom panel and an upper edge of the perimeter wall. In the above ideal embodiment, the length of the outer tray is ideally about 18 inches, the width of the outer tray is about 12 inches, and the height of the outer tray is about 3 inches to provide a sufficiently high barrier to prevent most crawling insects from easily crawling up the perimeter wall and so that the reservoir of the outer tray has an optimal depth for holding water.

A food bowl 19 is disposed in the reservoir of the outer tray. The food bowl rests on the bottom panel of the outer tray and is spaced apart from the perimeter wall of the outer tray so that fluid in the outer reservoir forms a moat around the food bowl. Optionally, the food bowl may be coupled and even detachably coupled to the bottom panel of the outer tray to fix the food bowl to the outer tray to prevent the food bowl from is knocked over by a pet and thereby cause the food contained in the food bowl to spill into the water in the reservoir of the outer tray.

A base 20 is also disposed in the reservoir of the outer tray and is coupled to the bottom panel of the outer tray such that the base upwardly extends from the bottom panel of the outer tray. The base is spaced apart from the food bowl. Preferably, as illustrated in FIG. 3, the base has a sloped top face 21 lying in a plane extending at an acute angle to the bottom panel of the outer tray. The slope of the top face of the base tilting downwards towards the food bowl in the reservoir of the outer tray.

A jug 22 is provided for holding a fluid (such as water) therein and has upper and lower ends 23,24. In an ideal embodiment, the jug has a generally rectangular transverse cross section taken in a generally horizontal plane. The upper end of the jug has an opening into the jug to permit refilling of the jug with fluid. The lower end of the jug is coupled to the top face of the base. Preferably, the lower end of the jug has a plurality of extents 25,26 downwardly extending therefrom which are inserted into corresponding bores in the top face of the base to detachably couple the lower end of the jug to the top face of the base to permit removal of the jug from the base for cleaning.

The jug has a lower spout 27 adjacent the lower end of the jug. As best shown in FIG. 3, the lower spout is positioned in the reservoir of the outer tray below the upper edge 28 of the perimeter wall of the outer tray such that fluid in the jug may pour into the reservoir of the outer tray via the lower spout of the jug to form a water moat. Because the lower spout of the jug is positioned below the upper edge the perimeter wall of the outer tray so that the reservoir is filled with fluid until the spout is submerged.

A food bin 29 for holding particulate pet food therein is provided and has top and bottom ends 30,31. The food bin is detachably attached to the jug. Preferably, the food bin has a mounting hook 32 at the top end of the food bin which is hooked onto the upper end of jug to detachably attach the food bin to the jug.

The food bin also has a bottom spout 33 adjacent the bottom end of the food bin. The bottom spout of the food bin is positioned adjacent and above the food bowl such that particulate pet food in the food bin may pass through the bottom spout and into the food bowl. The bottom end of the food bin preferably lies in a plane extending at an acute angle to the bottom panel of the outer tray when the food bin is attached to the jug. The slope of the bottom end of the food bin tilts downwards towards the bottom spout and thus the food bowl so that particulate pet food in the food bin is gravity feed to the bottom spout.

Preferably, as best illustrated in FIG. 1, the bottom spout has a generally trapezoidal configuration for helping to ensure that all of the particulate pet food in the food bin will be directed towards the bottom spout for complete emptying of the food bin.

Like the jug, the top end of the food is has an opening into the food bin for permitting refilling of the food bin with particulate pet food. The opening of the top end of the food bin and the opening of the upper end of the jug each have a lid 34,35 inserted therein to substantially close the respective opening. In use, the lids are designed for preventing pests and pets from getting into the particulate pet food and fluid in the food bin and jug respectively. Preferably, each of the lids have a lifting knob 36,37 for permitting lifting the respective lid.

As best illustrated in FIG. 1, the lid of the jug has a notch 38 therein receiving a portion of the mounting hook hanging over the upper end of the jug.

With reference to FIG. 4, optionally, the lids may be integrally coupled together to form a single lid 39 with a portion 40 that is inserted into the opening of the top end of the food bin and another portion 41 that is inserted into the opening of the upper end of the jug to close the openings. The two portions is spaced apart to form a space 42 for receiving adjacent parts of the top and upper ends, the space also has a notch for receiving a portion of the mounting hook.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet feeder, comprising;
   an outer tray defining a reservoir for holding a fluid;
   a food bowl being disposed in said reservoir of said outer tray;
   a base being disposed in said reservoir of said outer tray;
   a jug for holding a fluid therein;
   said jug being coupled to said base;
   said jug having a lower spout positioned in said reservoir of said outer tray;
   a food bin adapted for holding particulate pet food therein;
   said food bin being attached to said jug;
   said food bin having a bottom spout positioned adjacent and above said food bowl; and
   wherein said base has a top face lying in a plane extending at an acute angle to a bottom panel of said outer tray, said jug being coupled to said top face of said base.

2. The pet feeder of claim 1, wherein said jug has a plurality of extents downwardly extending therefrom, said extents of said lower end of said jug being inserted into corresponding bores in said base.

3. The pet feeder of claim 1, wherein said food bin and said jug each have an upper opening and a lid substantially closing the respective opening.

4. A pet feeder, comprising;
   an outer tray defining a reservoir for holding a fluid and having a bottom panel, and a perimeter wall upwardly extending around said bottom panel of said outer tray;
   wherein said outer tray is generally rectangular in configuration such that said bottom panel has a generally rectangular outer perimeter and said perimeter wall comprises a pair of spaced apart end wall portions and a spaced apart pair of side wall portions extending between said end wall portions of said perimeter wall;
   said outer tray having a length defined between said end wall portions, a width defined between said side wall portions, and a height defined between said bottom panel and an upper edge of said perimeter wall;
   a food bowl being disposed in said reservoir of said outer tray, said food bowl being spaced apart from said perimeter wall of said outer tray;
   said food bowl being coupled to said bottom panel of said outer tray;
   a base being disposed in said reservoir of said outer tray and being coupled to said bottom panel of said outer tray such that said base upwardly extends from said bottom panel of said outer tray;
   said base having a top face lying in a plane extending at an acute angle to said bottom panel of said outer tray;
   a jug for holding a fluid therein and having upper and lower ends;
   wherein said jug has a generally rectangular transverse cross section taken in a generally horizontal plane;
   said lower end of said jug being coupled to said top face of said base;
   wherein said lower end of said jug has a plurality of extents downwardly extending therefrom, said extents of said lower end of said jug being inserted into corresponding bores in said top face of said base;
   said jug having a lower spout adjacent said lower end of said jug, said lower spout being positioned in said reservoir of said outer tray below said upper edge of said perimeter wall of said outer tray;
   said upper end of said jug having an opening into said jug;
   a food bin adapted for holding particulate pet food therein and having top and bottom ends;
   said food bin being detachably attached to said jug, wherein said food bin has a mounting hook at said top end of said food bin, said mounting hook of said food bin being hooked onto said upper end of jug to detachably attach said food bin to said jug;
   said food bin having a bottom spout adjacent said bottom end of said food bin, said bottom spout of said food bin being positioned adjacent and above said food bowl such that particulate pet food in said food bin may pass through said bottom spout and into said food bowl;
   said bottom end of said food bin lying in a plane extending at an acute angle to said bottom panel of said outer tray when said food bin is attached to the jug;
   said top end of said food being having an opening into said food bin;
   said opening of said top end of said food bin and said opening of said upper end of said jug each having a lid inserted therein to substantially close the respective opening;
   said lids each having a lifting knob; and
   said lid of said jug having a notch therein receiving a portion of said mounting hook.

* * * * *